UNITED STATES PATENT OFFICE.

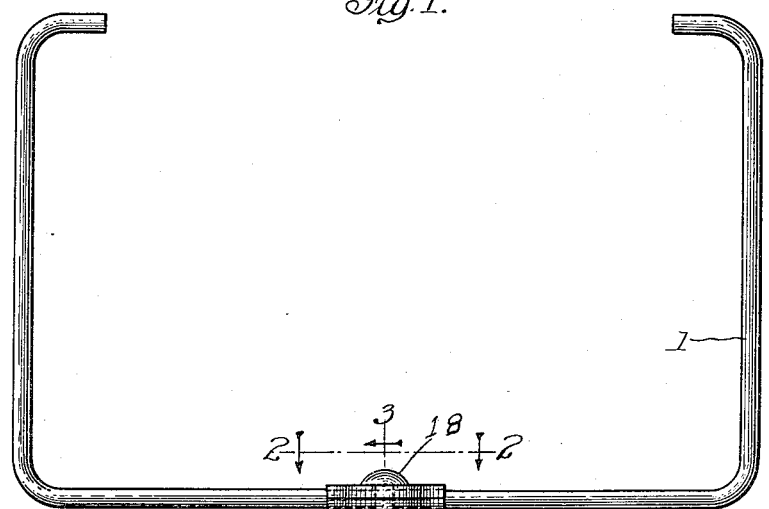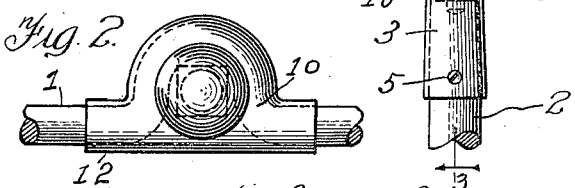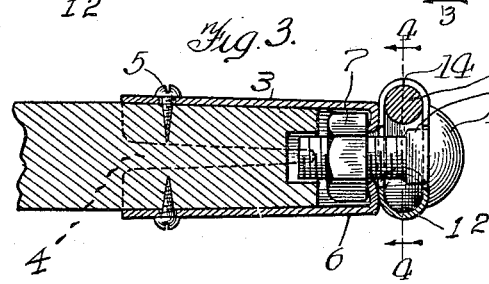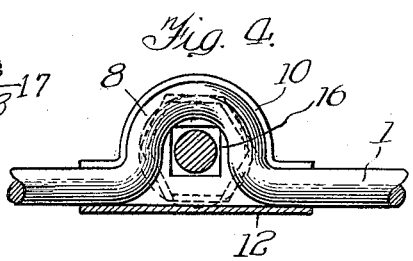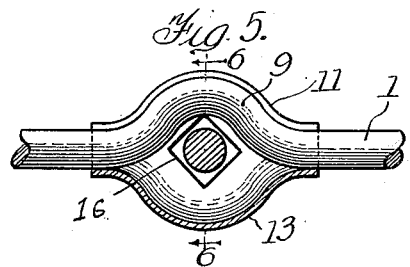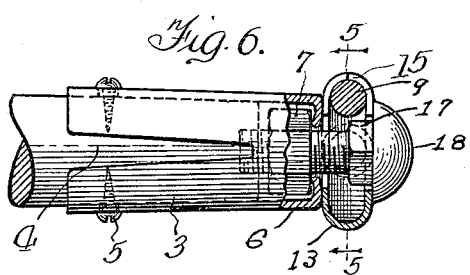

VICTOR JOSEPH BASENER, OF CHICAGO, ILLINOIS.

BAIL FOR VACUUM-CLEANERS AND CARPET-SWEEPERS.

1,175,920.   Specification of Letters Patent.   Patented Mar. 21, 1916.

Application filed February 26, 1915. Serial No. 10,865.

*To all whom it may concern:*

Be it known that I, VICTOR JOSEPH BASENER, a citizen of the United States, and a resident of Chicago, county of Cook, and State of Illinois, have invented a new and useful Improvement in Bails for Vacuum-Cleaners and Carpet-Sweepers, of which the following is a specification.

The object of my invention is to cheapen the cost of the connection between the handle and the bail.

The invention is set forth in the claims.

Reference will be had to the accompanying drawings in which,

Figure 1 is a plan of a bail embodying my invention. Fig. 2 is an elevation of the handle joint from the inside of the bail on line 2—2 of Fig. 1. Fig. 3 is a section on line 3—3 of Fig. 1. Fig. 4 is a section on line 4—4 of Fig. 3. Fig. 5 is a view similar to that of Fig. 4, but showing a modified form. Fig. 6 is a section on line 6—6 of Fig. 5.

Figs. 1 to 6 inclusive, show the bail upside down as relates to its position when on the machine.

In the drawing, 1 indicates a rod of iron bent in the form of a bail suitable for a hand operated vacuum cleaner or a carpet sweeper. 2 indicates a wooden handle substantially like a broom stick. The invention is involved in fastening the handle 2 to the bail 1 in a strong and cheap manner. For the end of handle 2, I prefer to make a split ferrule 3, drawn up out of a flat sheet of metal and having open sides 4, which have a spring clasp over the end of the stick 2 and are secured to the stick by the wood screws, 5. Handles frequently shrink after being fixed into the ferrule and with my construction the spring tension of the partly split halves follows up the shrinkage and keeps the fastening always tight. Further, the two screws 5 follow with the shrinkage of the wood and keep the metal always tight to the wood. I make the end 6 of the ferrule internally hexagonal to fit the periphery of a nut 7, inserted therein before the ferrule is affixed to the wood handle, so that the nut in use can rotate only with the ferrule.

I make the bail rod 1, with a curved eye, or U shaped bend at the middle, as is indicated by 8, in Figs. 1, 2, 3 and 4. This bend 8 is inclosed by a member 10 formed by pressing sheet metal into suitable symmetrical form and then bending it to U-shape to bring its rounded ends into registry with the bend 8 and the adjacent straight portions of the bail rod 1 inclosed between them as shown, the two halves of the member or clip being integrally connected at 12 leaving no passage to the rod on the lower side while on the upper side the clip closely fits the bend 8 of the rod and also closely fits around the adjacent straight portions. The rod embracing member is secured to the handle by a bolt 18 passing through the member, engaging the nut 7, and having a square shank 17 which lies in a square opening 16 in one part of the member. The nut being non-revoluble with respect to the handle and the bolt non-revoluble in the member 10, relative rotation of the handle and bail member clamps the member and the interposed bail rod between the bolt head and the end of the ferrule thus holding them between metal surfaces broad enough to give security against rocking, and of course not subject to material expansion and contraction. Figs. 5 and 6 show a slight modification, the clip when complete being curved upward and downward (at 13) symmetrically allowing the bolt 18 to lie in the plane of the bail and in alinement with the handle. The bend 9 of the bail rod is here made less abrupt than in the form first described, but in all respects other than those mentioned the two forms are substantially alike. It may be noted that in either form the handle and bail connecting devices are hardly more likely to engage or catch upon other articles than in case all the metal parts were integral, as at a glance they might easily be thought to be.

What I claim is—

1. The combination with a bail having in its middle portion a U-shaped lateral bend in a plane transverse to the general plane of the bail, of a clip closely embracing said bend, and a threaded bolt passing through the clip and adapted to engage a handle structure, substantially as set forth.

2. A bail curved in its central portion to engage or inclose a fastening for the handle, a clip inclosing the curved portion of the bail and forming a closure for the open side of the curved portion of the bail, said clip being provided with a hole in alinement with the opening of the curved portion of the bail, with a handle fastening passing through the hole.

3. The combination with a handle, of a split ferrule secured to the handle and extending over the end face thereof, a bail having its middle portion passing across the end of the ferrule and bent around the axis thereof, a clip embracing the bent portion, and a bolt passing through said clip into engagement with the ferrule.

4. The combination with a handle structure and a bail in the plane thereof and having its middle portion curved to pass around the handle's axis, of a clip bent U-like and fitting closely the outer part of said portion and closely around each of the contiguous straight parts of the bail, and a bolt passing through said clip in the axial line of the handle and in threaded engagement with said structure.

5. The combination with a bail bent to U shape at its central portion for the purpose of forming an eye of a clip covering the U bend, having the body portion covering the open side of the U bend and in alinement with the body portion of the bail, and provided with apertures for the passage of a bolt to receive a handle.

6. The combination with a handle, of a nut at the end of the handle, a ferrule, upon the end of the handle, inclosing said nut and preventing its rotation, a bail having at its middle a U-shaped bend transverse to the line of the handle, and a bolt alining with the handle, lying within said bend, engaging said nut, and arranged to force said bend toward the end of the handle.

7. The combination with a handle and a split ferrule for the same, of a nut at the end of the handle, non-revolubly inclosed by the ferrule and with its opening alined with the handle's axis, a bail bent at its middle to pass around the axial line of the handle, a clip embracing the bent portion of the bail, and a bolt passing through the clip, nonrevoluble in the same and engaging said nut.

Signed at Chicago, in the State of Illinois, and county of Cook this 24th day of February, 1915.

VICTOR JOSEPH BASENER.

Witnesses:
ANSELM BASENER,
GUS SCHULZE.

Copies of this patent may be obtained for five cents each, by addressing the "Commissioner of Patents, Washington, D. C."